(No Model.) 5 Sheets—Sheet 4.

G. LEWIS &. C. E. POINTON.
MACHINE FOR MAKING BREAD.

No. 571,774. Patented Nov. 24, 1896.

Witnesses
H. van Dedennee
E. A. Scott

Inventors
George Lewis
Charles Edward Pointon
by Richards
Attorneys (No Model.) 5 Sheets—Sheet 5.

G. LEWIS & C. E. POINTON.
MACHINE FOR MAKING BREAD.

No. 571,774. Patented Nov. 24, 1896.

UNITED STATES PATENT OFFICE.

GEORGE LEWIS AND CHARLES EDWARD POINTON, OF WELLINGTON, NEW ZEALAND.

MACHINE FOR MAKING BREAD.

SPECIFICATION forming part of Letters Patent No. 571,774, dated November 24, 1896.

Application filed May 15, 1896. Serial No. 591,699. (No model.) Patented in England May 17, 1894, No. 9,683, and in Germany April 2, 1895, No. 86,357.

*To all whom it may concern:*

Be it known that we, GEORGE LEWIS, residing at Park Street, Wellington, and CHARLES EDWARD POINTON, residing at Wrekin Road, Wellington, in the county of Salop, New Zealand, citizens of Great Britain, have invented certain new and useful Improvements in Machines for Making Bread, (for which we have obtained a patent in Great Britain, No. 9,683, bearing date May 17, 1894, and in Germany, No. 86,357, dated April 2, 1895,) of which the following is a specification.

This invention relates to improvements in machines for dividing equal portions of dough from one mass or large quantity for the purpose of making a number of regularly-shaped and uniform loaves or cakes.

We will describe our invention by reference to the five accompanying sheets of explanatory drawings, to be hereinafter referred to.

Figure 1:
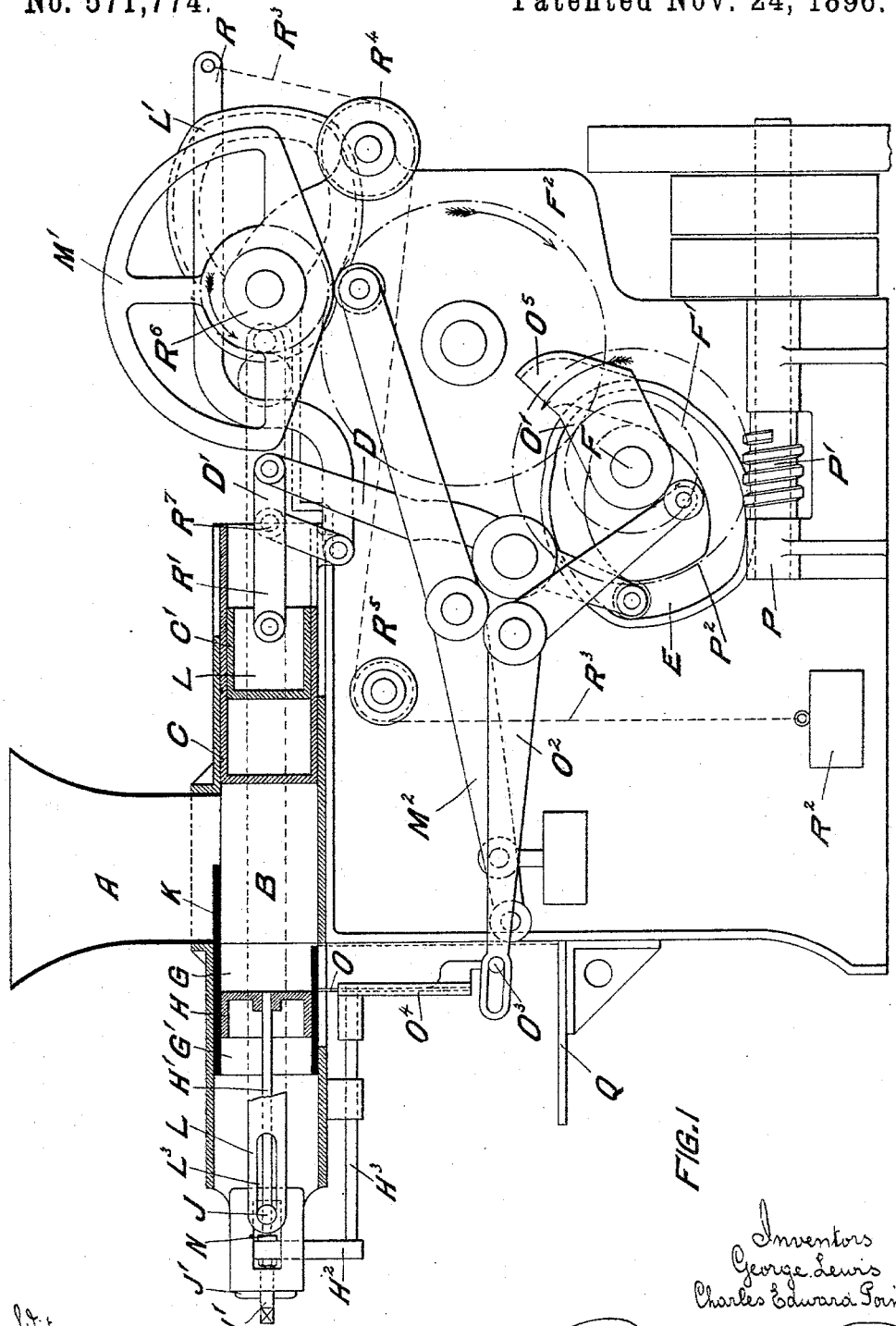
Figure 2:
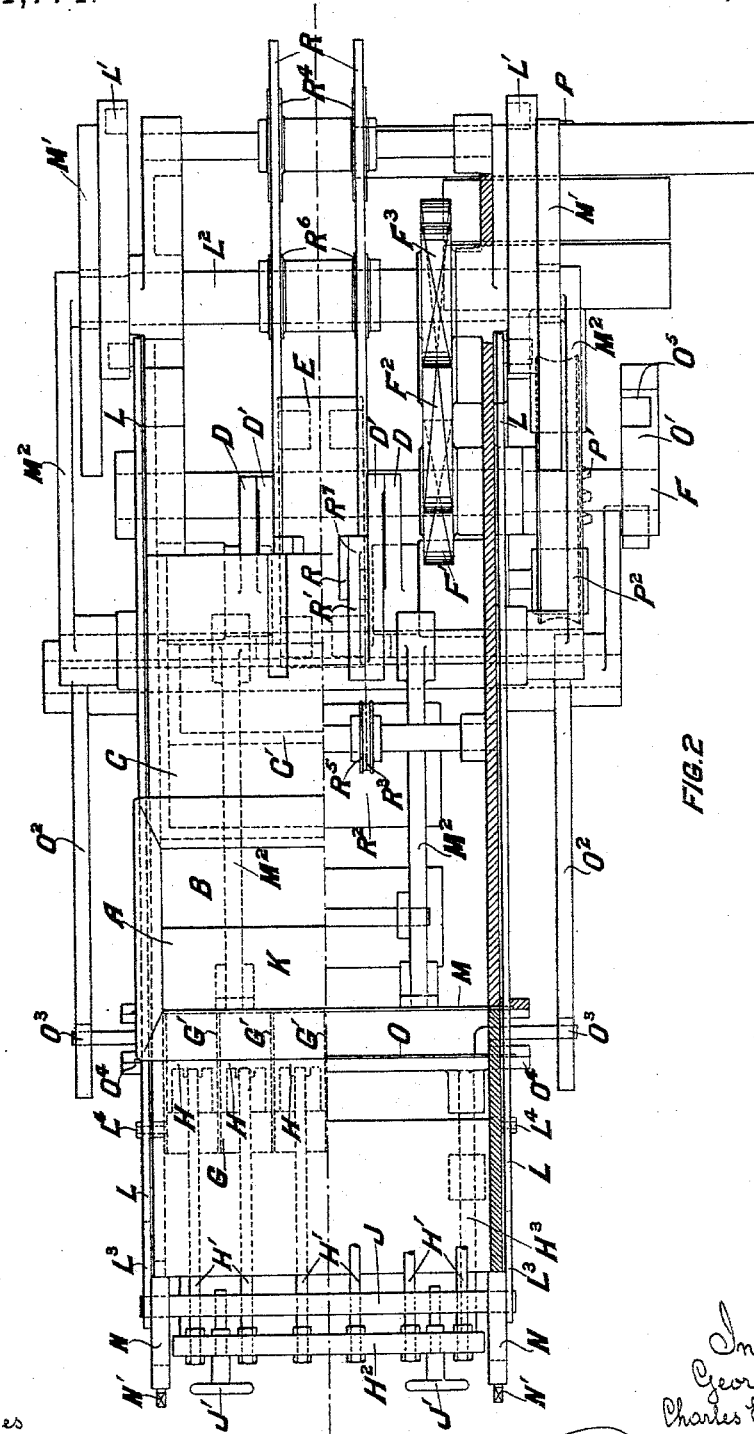
Figure 3:
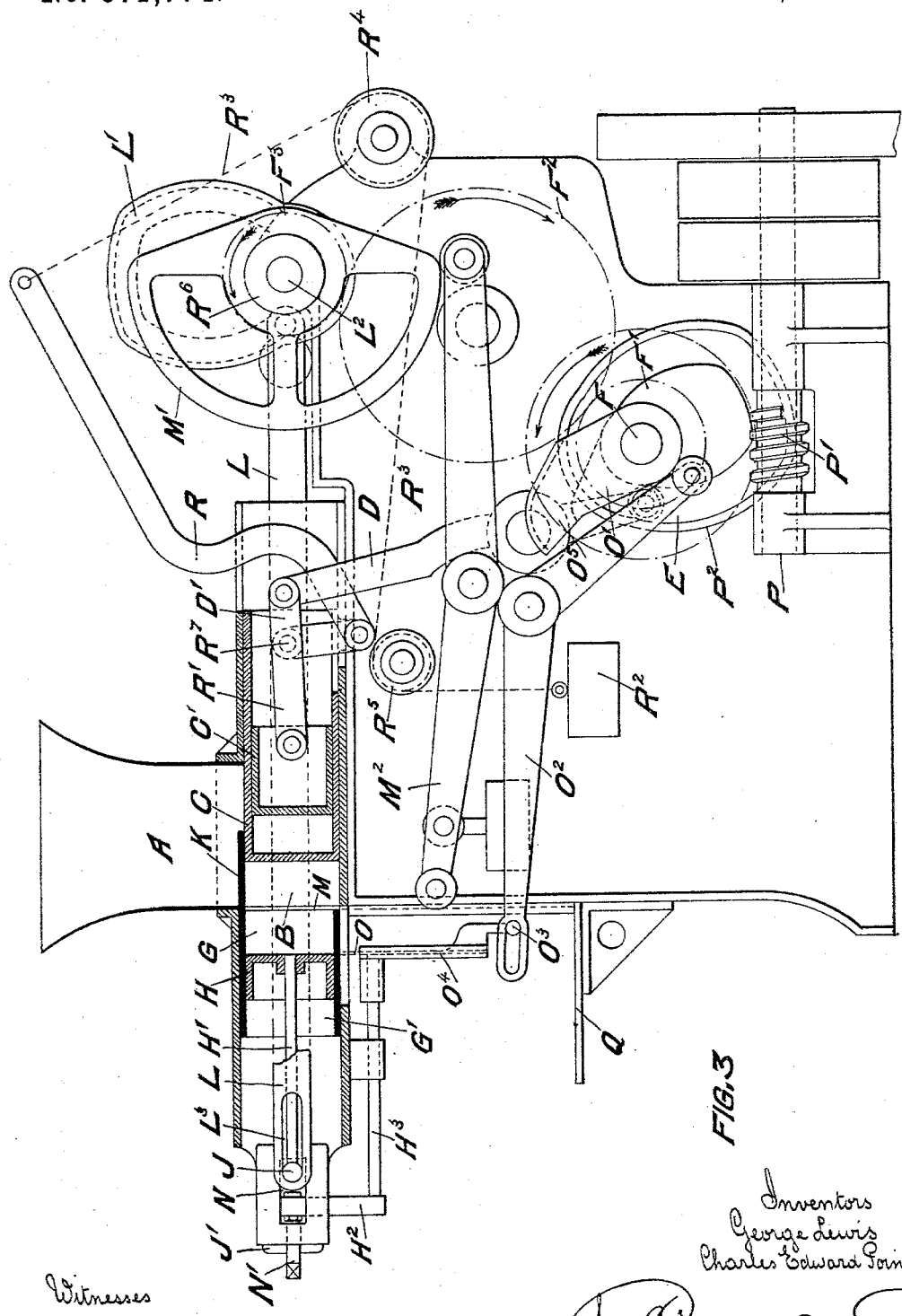
Figure 4:
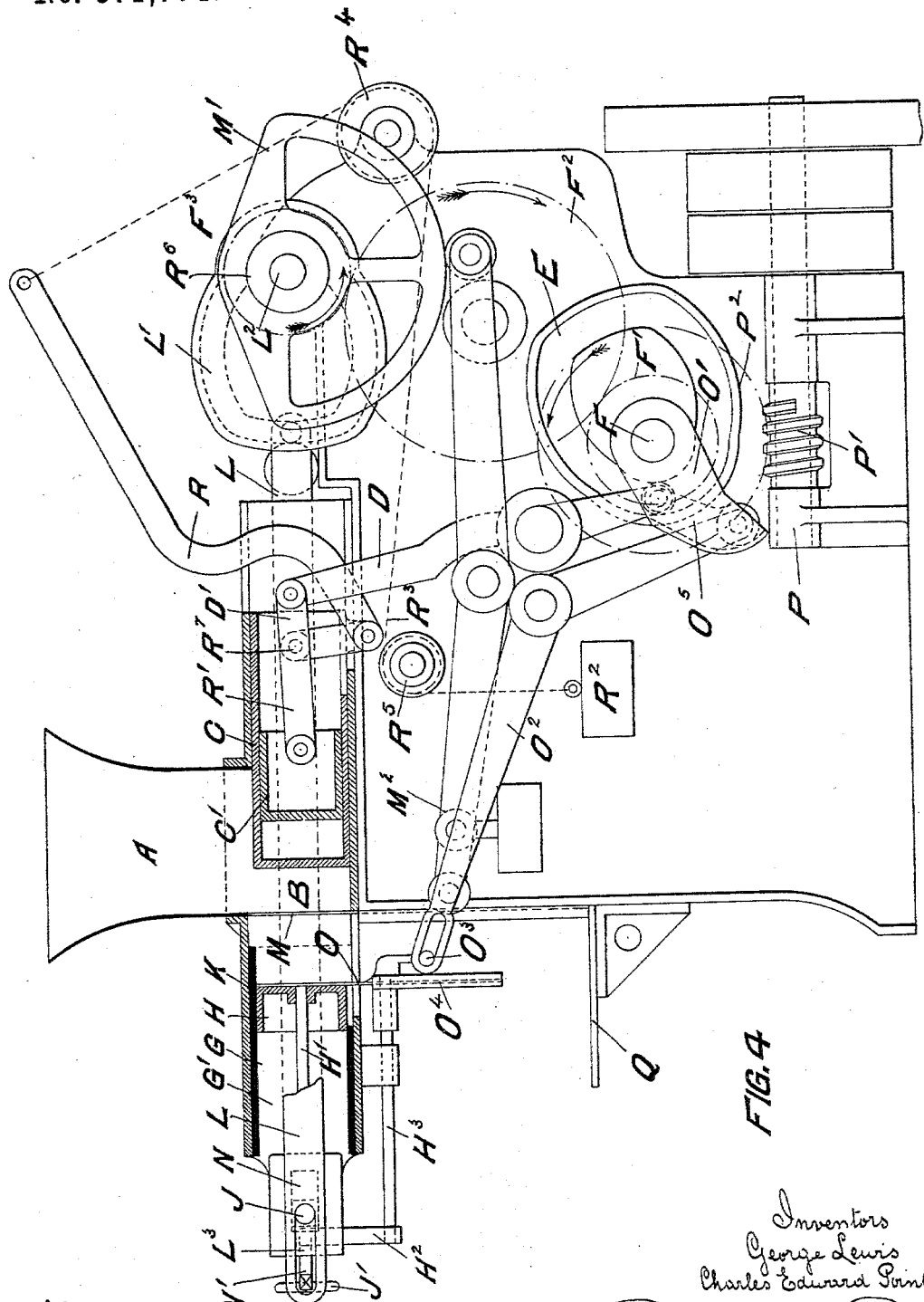
Figure 5:
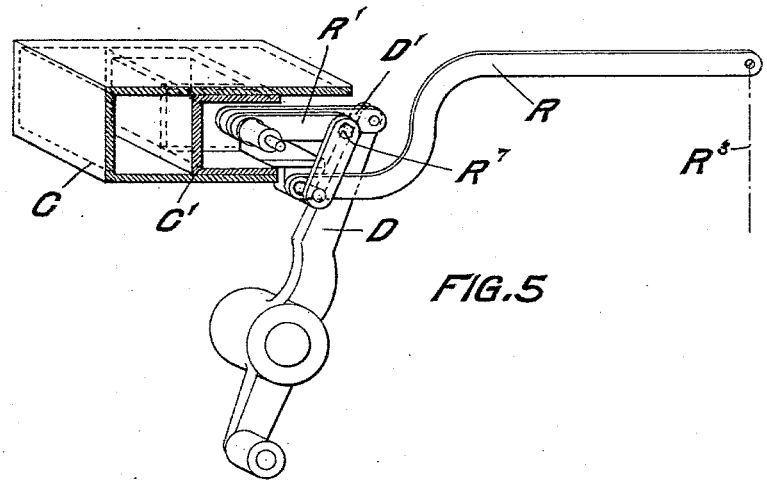
Figure 6:
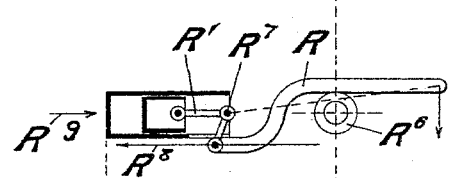
Figure 7:
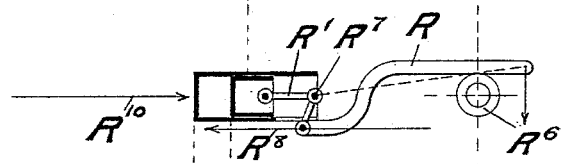
Figure 8:
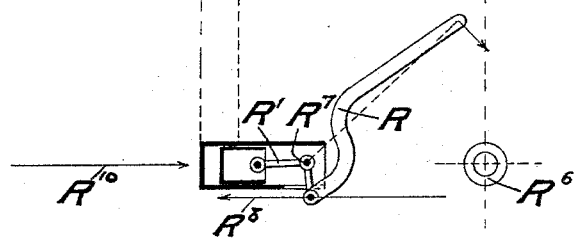

Figure 1 is a side elevation having one side frame removed, and Fig. 2 a plan representing our improved machine, both views being partly in section. Figs. 3 and 4 are similar views to Fig. 1, but with the mechanism represented as disposed at different parts of one revolution of the main shaft of the machine, Fig. 3 indicating the position of the mechanism after one quarter-revolution from the initial position of the main shaft in Fig. 1, and Fig. 4 the position after a further quarter-revolution. Fig. 5 is a perspective sectional view of the compound ram and the levers connected therewith. Figs. 6, 7, and 8 are diagrams illustrative of the action of the compound ram.

The same reference-letters in the different views indicate the same parts.

In order to render the action of our improved machine more clear, we will describe the various parts and the cams and levers for operating them and the purposes to be served by their respective operation.

The mass of dough to be divided and formed into equal portions is placed in the hopper A, which has an open top and bottom. The hopper is mounted upon the chamber B, into which the dough passes direct from the hopper. In one end of the chamber B we place the compound sliding ram C, which is moved in and out of the chamber by means of the levers D and links D', operated by the grooved cam E on the main shaft F of the machine. The function of this ram is to force the dough contained in the chamber B into the box G, to be described. Within the opposite end of the chamber B we place the sliding box G, attached to the side rods L by the studs $L^4$, passing through slots in the chamber B. The side rods L are operated by the cams L', which are of such configuration as to cause the box G to remain stationary, when in the position shown in Fig. 1, a sufficient time to allow the dough to be forced into it by the ram C.

The front of the box G is continued forward at K, so that when the ram C advances the dough contained in the chamber B is confined and therefore capable of being compressed into the box G. The sliding box G consists of one casting having a number of division plates or partitions G' to form separate chambers in which the dough forced by the ram C into the box G locates itself in equal bulks of the size required to be divided by the machine. Such chambers are open at each end and each has a plunger H fitted within it, each plunger being connected by a rod H' to one common cross-head $H^2$. The cross-head $H^2$ is connected to the cross-head J by the screws J'. The cross-head J slides in the slots N, formed in projecting ends from the chamber B. Stop-screw N' extends through the slotted end portions of the frame and into the slots N, so as to contact with the cross-head J to arrest the motion of the plungers H.

The ends of the cross-head J engage with slots $L^3$ in the side rods L, which prevent the cross-head J and plungers H being pushed back when the ram C presses the dough into the box G. The opposite end of the slot has no action on the cross-head J.

By means of the screws J' and cross-head $H^2$ the position occupied by the plungers H in the box G can be varied. This arrangement allows different quantities of dough to be divided at will. The cross-head $H^2$ also supports one end of the rods $H^3$, to the opposite end of which is secured the slide $O^4$, carrying the knife O, operated by the cam O' on the main shaft F, acting on the levers $O^2$, which are connected to the arms $O^3$ on the knife O. The knife O is placed in line with the faces of the plungers H, and has for its object the separation of the dough from the said plungers when the said dough is ready to be discharged from the machine. The cam O' has a grooved slot or part O⁵ to cause the descent of the knife O.

We place a knife M in the same plane as the front of the sliding box G when in position for receiving the dough, as in Fig. 1. The knife M is caused to move by the levers M² and cam M' on the shaft L² across the mouth of the sliding box G after the said box has been charged with dough by the ram C, thereby separating the dough contained in the chambers of the said box G from any excess in the chamber B. The cam M' on the shaft L² is of such configuration as to cause the knife M to rise immediately the box G is filled with dough and to remain up during the whole time that the ram C is in the position shown in Figs. 3 and 4.

As the quantity of dough confined by the ram C passing under the part K of the sliding box G is liable to vary the ram C is provided with a compound arrangement which acts as a release and causes the said dough to be always compressed to the same extent.

We arrange the compound ram as follows: Instead of fixing the links D' and levers D direct to the ram C we provide an inner ram C', sliding freely in the ram C and rigidly connected to the said links D' and levers D. The motion of the inner ram C' is governed entirely by the cam E, acting through the links D' and levers D; but the motion of the outer ram C varies each stroke according to the quantity of dough which finds its way into the box G. To the back of the ram C we pivot bell-crank levers R, having long arms, to which a weight R² is attached by means of the chains R³, passing over wheels R⁴ and R⁵. The short arms of the said levers R are connected to the inner ram C' by the links R'.

As shown in Fig. 1, the weight R² is supported by the rollers R⁶ under the long arms of the levers R, and therefore cannot move the ram C forward into the chamber B by causing the levers R to move about R⁷ as a fulcrum, as shown in the diagram Fig. 6.

When the ram C' is moved forward by the cam E and levers D, the ram C will be carried forward also, as the weight R², acting through the bell-crank levers R, is capable of exerting a great pressure in the direction of the arrow R⁸, Fig. 6, and the loose dough being pushed by the face of the ram C only exerts a small pressure in the direction of the arrow R⁹. When, however, the dough is fully compressed into the box G, the pressure on the face of the ram C will rise and exert a force in the direction shown by the arrow R¹⁰, Fig. 7. When the pressure on the face of the ram C (represented in direction by the arrow R¹⁰) becomes equal to the pressure R⁸ exerted by the weight R² through the levers R, the ram C will remain stationary. The inner ram C' continues its motion forward as governed by the cam E and levers D. As the ram C' moves forward the link R' connected thereto will act on the short arm of the bell-crank lever R, thereby raising the long arm and the weight R², as shown at Figs. 3 and 8. The pressure on the dough, however, will still be the same.

The shafts L² and F are connected by toothed gearing F' F² F³, so that they make the same number of revolutions and revolve in the direction shown by the arrows. Motion is given to the machine by a worm-wheel P², operated by a worm P' on a shaft P, carrying belt-pulleys.

The action of the machine is as follows: Dough is placed in the hopper A, a portion of which passes down into the chamber B during the time that the mechanism is passing from the position shown in Fig. 4 to that shown in Fig. 1. The compound ram C now advances toward the box G, pushing the dough in the chamber B before it. The front of the compound ram C passes under the part K of the box G, thereby confining the dough and forcing it into the box G, as already described. The levers R will not rise until the box G is full of dough, and the continuation of the motion of the compound ram C causes great pressure, owing to the resistance of the dough, as already described, with reference to the diagrams Figs. 6, 7, and 8. The box G and plungers H remain stationary during this operation, being prevented from sliding away from the compound ram C by their connections with the side rods L, which are in turn connected to the grooved cams L', as before described. The levers R, having risen against the pull of the weight R and thereby caused full compression of the dough in the box G, the knife M is caused to rise by the cams M' operating on the levers M². This position of the machine is shown by Fig. 3. The measured quantities of dough are now in the divisions of the box G, and the only function to be performed by the machine is to discharge them onto a suitably-placed table Q. The box G now moves away from the knife M, owing to the configuration of the cams L', carrying with it the measured quantities of dough. This operation causes the dough to separate from the knife M. The plungers H are carried back by the box G until the cross-head J comes in contact with the screws N'. The motion of the plungers H is now arrested, but the box G continues to move back, thereby extracting the blocks of dough from the divisions in the box G. As before described, the slide O⁴, carrying the knife O, is carried back with the plungers H, owing to its connection with the cross-head J. The box G having moved out of the way, the knife O is driven up the faces of the plungers H by the cam O', acting on the lever O². The position of the machine at this stage is shown by Fig. 4. This operation separates the blocks of dough from the faces of the plungers H, and they are now free to fall on the table Q. The cycle of operations is now complete, and the compound rams C and the knives M and O and box G and plungers H are free to return to the positions shown in Fig. 1 by the action of their respective cams, as described.

Having now described our invention, what we claim as new, and desire to secure by Letters Patent, is—

1. The improvements in bread-making and analogous machinery comprising a dividing-chamber having a hopper mounted thereon and fitted at one end with a sliding ram, and at the opposite end with a sliding box provided with separate compartments, in combination with a pair of reciprocating knives, one of said knives being arranged to free the dough in the sliding box from the excess of dough in the dividing-chamber after compression, and the other being arranged to free the dough from the sliding box for the discharge of the same substantially as set forth.

2. In combination, the chamber B, and a ram having inner and outer parts C, C', means for operating the inner part positively and a yielding connection between the inner and outer parts, substantially as described.

3. In combination, the chamber B, the ram comprising the inner and outer parts, the positive means for operating the inner part, and the weighted-lever connection between the inner and outer parts, substantially as described.

4. In combination, the chamber B, the ram comprising the inner and outer parts, the means for positively operating the inner part, the weighted bell-crank lever fulcrumed on the outer part and the connection from said lever to the inner part, substantially as described.

5. In bread-making and analogous machinery the combination of a ram C having an inner sliding part C', with weighted levers R and links R' and the cam-levers D and links D', substantially as set forth.

6. In combination in bread-making machinery, a sliding box G formed into separate compartments by plates or partitions G', each compartment being open-ended, a plunger H, the cross-head H², the rod H' connecting the plunger to the cross-head and means for reciprocating the cross-head, substantially as described.

7. In bread-making and analogous machinery the combination comprising the sliding box G having separate compartments a plunger H in each compartment the cross-head H², a cross-head J the adjusting-screws J' connecting the two cross-heads, the said plungers H being connected to the cross-heads H², substantially as set forth.

8. In bread-making and analogous machinery the combination of the cross-head J the cross-head H² connected thereto and the attached plungers H, with the slotted side rods L and cams L', substantially as set forth.

9. In combination with the mold-box, the plunger in the box, a knife arranged to maintain its relation to the plunger in its different positions in the box and means for operating the knife when the plunger is in position to discharge the dough, substantially as described.

10. In combination, the sliding box, the side rods L connected thereto and having slotted ends, the plunger H, the cross-head J moving in the slots and the connection from said cross-head to the plunger, substantially as described.

11. In combination, the sliding box, the plunger operating therein, and the knife O with connections between the same and the plunger and means for operating the knife when the plunger is in discharging position, substantially as described.

In witness whereof we have hereunto set our hands in presence of two witnesses.

GEORGE LEWIS.
CHARLES EDWARD POINTON.

Witnesses:
HERBERT BOWKETT,
THOMAS J. BAYLISS.